(No Model.)

H. V. DES PORTES.
ARTIFICIAL TOOTH.

No. 557,654. Patented Apr. 7, 1896.

Witnesses:
L. C. Hills.
A. L. Hough.

Inventor:
Hippolyte V. Des Portes,
by Franklin H. Hough
Attorney.

United States Patent Office.

HIPPOLYTE V. DES PORTES, OF MANCHESTER, VIRGINIA.

ARTIFICIAL TOOTH.

SPECIFICATION forming part of Letters Patent No. 557,654, dated April 7, 1896.

Application filed February 25, 1896. Serial No. 580,702. (No model.)

*To all whom it may concern:*

Be it known that I, HIPPOLYTE V. DES PORTES, a citizen of the United States, residing at Manchester, in the county of Chesterfield and State of Virginia, have invented certain new and useful Improvements in Artificial Teeth; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in the construction of artificial teeth and in the means employed in securing the tooth to the plate and in attaching adjoining teeth together.

Heretofore it has been common in the manufacture of artificial teeth to first construct a base portion of porcelain or other like substance adapted to the purpose and to the exposed face of the base portion to attach a facing, either of gold, platinum, or porcelain. The nature of the material of which the teeth have been composed has been such as to preclude the possibility of using solder, either as a securing means for attaching the tooth to the plate or of attaching the teeth in the set together at their adjoining edges.

The object of the present invention is to provide a tooth of solid metal of a character which will admit of the use of solder in securing the tooth to the plate, and also of attaching several teeth in a series securely together at their adjoining edges.

To this end, and to such others as the invention may pertain, the same consists in the formation of a tooth of solid metal, and which may be used either independently of or in connection with facings or caps of gold, platinum, porcelain, or any of the substances which have heretofore been used for this purpose. The essential object of the invention, however, resides in the construction of a tooth or a series of teeth of solid metal and in the use of solder as a means of attaching the tooth to the plate and of securing together a series of teeth, all as hereinafter more fully described, shown in the accompanying drawings, and then specifically defined in the appended claims.

The invention is clearly illustrated in the accompanying drawings, which, with the letters of reference marked thereon, form a part of this specification, and in which drawings—

Figure 1:
Figure 2:
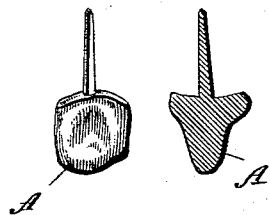
Figure 3:
Figure 4:
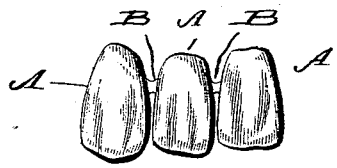

Figure 1 is a front and vertical section of the tooth constructed in accordance with my invention. Fig. 2 shows like views of a tooth provided with vertical extended pins integral with the body portion of the tooth and serving as a means for attaching the tooth to the plate. Fig. 3 is a like view showing a tooth provided with integral pins upon the rear face of the tooth. Fig. 4 is a perspective view of a series of teeth soldered together.

Reference now being had to the details of the drawings by letter, A represents a solid metal tooth formed in a single casting and of any metal which may be found to be best adapted to the purpose. The tooth may be of any of the various forms in which they are now constructed—as, for instance, they may be made without pins or other attaching means, as shown in Fig. 1 of the drawings, it being my intention, where teeth of this form are provided, to secure the same directly to the plate, either by solder or other means; or the tooth may be provided with pins cast integral with the body portion of the tooth and extending vertically from the upper edge of the body portion, as shown in Fig. 2 of the drawings; or the tooth may be provided with one or more pins of this character extending or projecting from the rear face of the tooth, as shown in Fig. 3.

The value of my invention is due in a great measure to the fact that with a solid metal tooth such as I have described it is possible to attach the several teeth in a series securely together by means of solder, as I have shown in Fig. 4 of the drawings, in which the teeth A are shown as connected together at their adjoining edges by solder, as shown at B.

While it is my intention to construct the tooth entirely of metal, and therein resides the gist of my invention, it is at once evident that with a tooth so constructed facings of various kinds, such as have heretofore been commonly employed for the purpose, may be readily secured to the body of the tooth by solder, thus providing a permanent securing means which will effectually prevent the facing of the tooth from being accidentally detached, as is likely to occur with the securing means heretofore employed. It is equally evident that any of the various forms of artificial caps or crowns may be used in connection with the tooth.

Having thus described my invention, what I claim to be new, and desire to secure by Letters Patent, is—

1. An artificial tooth composed of a single piece of metal, and having securing-pins integral with the body portion of the tooth, substantially as described and for the purpose specified.

2. A series of teeth each composed of a single piece of metal, the several teeth in the series being connected together at their adjoining edges by solder or its equivalent, substantially as described.

3. The combination with an artificial-tooth plate, of a tooth composed of a single piece of metal, and secured to the plate by solder, substantially as described.

In testimony whereof I affix my signature in presence of two witnesses.

HIPPOLYTE V. DES PORTES.

Witnesses:
FRANKLIN H. HOUGH,
A. L. HOUGH.